F. W. HOWE.
GOVERNOR FOR STEAM ENGINES.
No. 17,879.          Patented July 28, 1857.
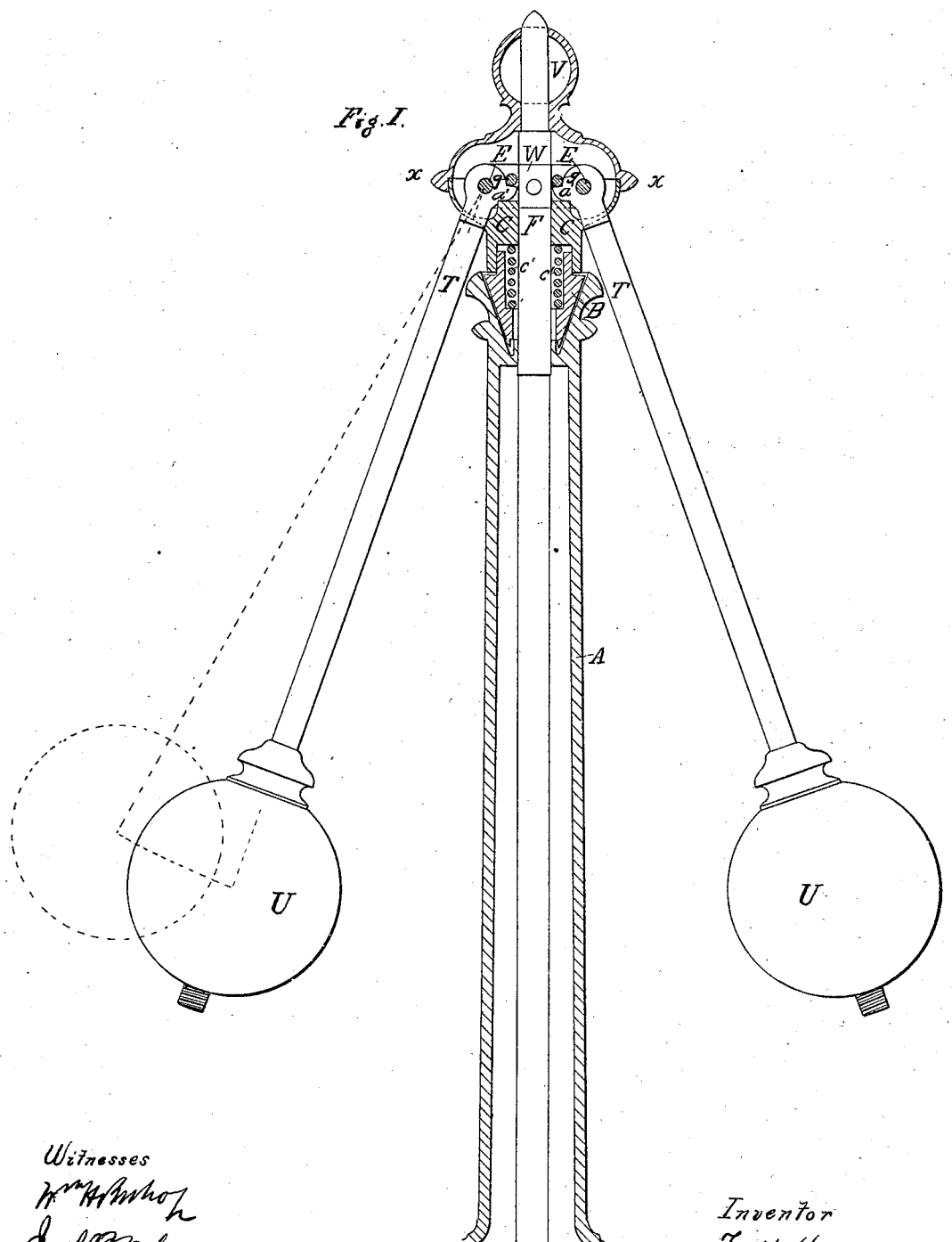

UNITED STATES PATENT OFFICE.

F. W. HOWE, OF NEWARK, NEW JERSEY.

GOVERNOR FOR ENGINES, &c.

Specification of Letters Patent No. 17,879, dated July 28, 1857.

*To all whom it may concern:*

Be it known that I, FREDERIC W. HOWE, of Newark, in the county of Essex and State of New Jersey, have invented a new and useful Improvement in Governors for Steam-Engines and Other Motors; and I do hereby declare that the following is a full, clear, and exact description thereof, reference being had to the accompanying drawings, making part of this specification, in which—

Figure 1 is a central vertical section of the governor and its appendages; Fig. 2 a horizontal section taken at the line W, w, of Fig. 1; Fig. 3 a sectional side elevation of the governor stand; Fig. 4 another sectional side elevation of the governor stand; and Fig. 5 a horizontal section taken at the line H, h, of Fig. 1.

The same letters indicate like parts in all the figures.

My said invention relates to an improvement of the fly ball governor for regulating the motion of steam engines, water wheels or other motors, by means of which the motion is more perfectly regulated than by any other plan known to me.

In the accompanying drawing (A) represents a hollow round column on a hollow square stand and (L) a driving pulley driven by a belt for the engine or other motor, but for which other gear may be substituted. This pulley is on a horizontal shaft (L'), (having its bearing in the base of the column) which carries a bevel cog wheel (K) which engages a corresponding bevel cog wheel (K') turning loosely on a vertical shaft (F) in the center of the hollow column. The lower end of this shaft rests on a step (2) in the base of the column; it is properly journaled to an inner stand (R) in the base, and also at top in the upper end of the column, and is prevented from rising by a nut (y) and washer (x) below the stand (R). To this shaft is secured a bevel cog wheel (H) which receives motion from the driving pulley (L) through the bevel wheels (K) and (K') before described, the latter of which (K') has attached to it another bevel cog wheel (I') which engages a bevel wheel (I) that engages the wheel (H) on the said vertical shaft (F). The bevel wheel (I) is on one arm of a horizontal hub (S) which turns freely on the said shaft (F) and this hub carries a horizontal cogged segment (S') the cogs of which engage the cogs of a rack (M) adapted to slide in suitable ways in the base of the column. When the hub (S) of the bevel wheel (I) is held in a fixed position by the rack (M) the rotation of the driving pulley, which imparts motion to the bevel wheel (I') by the wheels (K) and (K'), rotates the shaft (F) in the reverse direction of the wheel (I') because the motion imparted by the wheel (I') to (I) is then all transmitted to the wheel (H) attached to the shaft; but if the shaft (F) be held so that it cannot rotate, and the hub (S) on which the wheel (I) is mounted be free to turn on the shaft (F) then all the motion imparted to the wheel (I) by the wheel (I') will cause the said wheel (I) to revolve or travel about the shaft (F). For the purpose of holding the axis of the wheel (I) a chain (o) is attached to the rack (M) passes over a guide pulley (N) and has a weight (P) attached to it which weight tends constantly to force the rack in one direction, and to resist the tendency of the hub (S) to be turned by the driving power which rotates the wheel (I), and therefore, so long as the power required to turn the shaft (F) is less than the power required to lift the weight (P), the shaft (F) will be rotated by the driving pulley (L) through the intermediate gearing, but so soon as the resistance on the shaft (F) is increased beyond the power required to lift the weight, the wheel (I) will begin to travel or revolve about the axis of the shaft (F) which will cause the rack (M) to be moved in the direction to lift the weight, and to the extent of this motion the shaft (F) will be retarded.

On the upper end of the shaft (F) there is a cross head (w) forming two horizontal arms to the ends of which are hung, by joint pins (E, E), the rods (T, T) of the usual governor balls (U, U) which are prevented from falling below a certain elevation by spurs (a', a') which strike against stop pins (g, g) on the arms or cross head (w). The under face of the spurs (a', a') are cam formed and act on the upper end of a cap (C) which is free to slide up and down on the shaft, so that when the balls U, U, are thrown out by centrifugal force the spurs (a', a') force down the cap (C) which rests on a helical spring (c') in a cup in the upper end of an inverted cone (B) attached to and rotating with the shaft (F). The conical surface of the inverted cone (B) is fitted to a conical cavity in the upper end of the column (A).

The sliding rack (M) is to be connected in any suitable manner with a throttle valve or with the apparatus which closes the cut off valves of a steam engine, if the governor be applied to a steam engine, or with the gate which lets in the water onto a water wheel, if applied to govern the speed of water wheels.

From the foregoing it will be seen that whenever the speed of the engine is too great the balls (U, U) will be thrown out by centrifugal force, this will gradually compress the helical spring and by degrees increase the friction of the cone (B) with the conical cavity of the column, and as the cone (B) is feathered to and turns with the shaft (F) this gradually increasing friction will gradually retard the motion of the shaft (F) and as this is gradually retarded the hub (S) is gradually started by the differential wheel (I) which by the cogged sector (S') moves the sliding rack (M) lifting its weight, which operates the valve to admit less steam if a throttle or to cut off shorter if a cut off, or to admit less water if a water wheel. And as the increased friction of the cone reduces the velocity of the shaft (F) the balls will be depressed by gravity to relieve the friction after regulating motion has been induced. In this way the motion of an engine or water wheel can be regulated with greater accuracy than by any other means known to me.

I am aware that the arrangement of wheels herein described has been employed to regulate the admission of steam to an engine or water to a wheel for the purpose of regulating the velocity by motion of the intermediate wheel induced by the difference between the motion of the motor and that of the governor. And I am also aware that the centrifugal force of the pendulum ball of a governor has been employed to make friction to retard the motion of the governor and by the differential motion to regulate the supply of steam or water.

I am also aware that it has been proposed to regulate the supply of steam to steam engines by an arrangement which enables the fly ball governor by an intermediate mechanism to increase or decrease the throw of the eccentric which operates the valves, the governor slide being connected with a friction brake so as to increase or decrease the friction thereof to make it greater or less than another friction, thus determining the throw of the eccentric by the relations of the two frictions, determined by the position of the fly balls as they are elevated or depressed by the velocity of the engine; but it will be seen that the arrangement and combination of these are materially different from what I have described as constituting my invention. I do not, however, wish to be understood as making claim broadly to the modes of operation above pointed out. But What I do claim as my invention and desire to secure by Letters Patent, is—

The arrangement of the vertical shaft receiving motion from the motor by the differential motion, substantially as herein described, to regulate the supply of steam to an engine or water to a wheel, the said shaft having arms to which are suspended the arms of the fly balls provided with cam like projections, in combination with the sliding cap on the shaft, the friction cone feathered to the shaft and fitted to a conical cavity of the column or standard, and the spring interposed between the friction cone and the cap, substantially as and for the purpose specified.

F. W. HOWE.

Witnesses:
 WM. H. BISHOP,
 JOEL B. WILSON.